Feb. 14, 1939.   A. BERNHARD ET AL   2,147,396
PHOTOELECTRIC EXPOSURE METER
Original Filed March 14, 1935

Inventors:
Albrecht Bernhard,
Guido Beyrich,
Hans Habermann,
By Stone, Boyden & Mask.
Attorneys.

Patented Feb. 14, 1939

2,147,396

UNITED STATES PATENT OFFICE 2,147,396

PHOTOELECTRIC EXPOSURE METER

Albrecht Bernhard, Guido Beyrich, and Hans Habermann, Nuremberg, Germany, assignors to Metrawatt Aktiengesellschaft, Fabrik Elektrischer Messgeraete, Nuremberg, Germany, a company of Germany Original application March 14, 1935, Serial No. 11,140. Divided and this application July 13, 1937, Serial No. 153,416. In Germany March 23, 1934

4 Claims. (Cl. 88—23)

This application is a division of our original Patent application No. 11,140 filed on March 14, 1935, on which Patent No. 2,092,826 has been issued.

The present invention relates to a photoelectric exposure meter of the type comprising a photo-electric element and a direct current measuring instrument. Apparatus of this kind usually comprise an adjustable iris diaphragm arranged in front of the photo-electric element which enables the stop adjustment and plate sensitivity to be used for the particular exposure to be taken into account in the measurement.

It is an object of the present invention to provide an exposure meter wherein an adjustable iris diaphragm is dispensed with.

A further object of the invention is to provide a photoelectric exposure meter comprising a plurality of scales inter-related in such a manner that exposure times may be derived from the photo-electric indication, for different stops and plate sensitivities.

A still further object of the invention is to provide an exposure meter in which a photo-electric indication may be interpolated for a selected plate sensitivity and stop value to establish the corresponding exposure time.

Still another object of the invention is to provide a photo-electric exposure meter wherein manually operable means are provided which can be set in accordance with a given plate sensitivity and/or stop value to interpolate a photoelectric indication into a corresponding exposure time for the given plate sensitivity and a stop value.

Further objects of the invention will be apparent from the description as it proceeds.

In order that the invention may be more clearly understood some embodiments thereof are described hereinafter with reference to the accompanying drawings in which.

Figure 1:
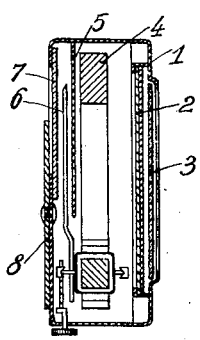
Fig. 1 is a cross-sectional view of one form of exposure meter according to the invention.
Figure 2:
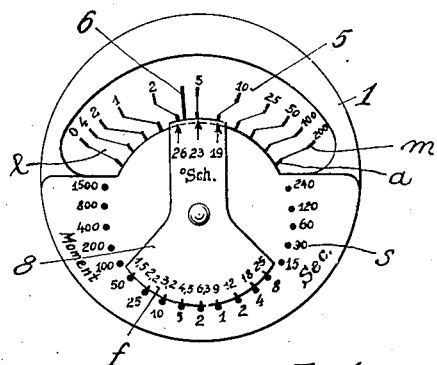
Fig. 2 is a front view of the meter shown in Fig. 1.

In Figs. 1 and 2 an exposure meter is shown comprising a casing 1, a photo-electric element 2, and a protective disc 3. The current measuring instrument comprises the magnet 4, the scale 5 and the pointer 6, which is visible through an aperture 7 in the casing. The measuring scale 5 is divided into non-uniform (logarithmic) divisions $m$ representing exposure times, corresponding to a given stop and a given plate sensitivity, the scale divisions $m$ being somewhat more widely spaced at the centre owing to the non-uniform distribution of the field between the poles of the permanent magnet. In order to facilitate the interpolation of the exposure times read off, for different stops and/or plate sensitivities, a member 8 is rotatably mounted on the casing of the exposure meter. The member 8 carries at one end a scale calibrated in the usual stop values $f$, which moves over a scale $s$ divided in the usual exposure times. At the other end, the slide carries a scale divided in plate sensitivities (26°, 23°, 19° Sch.) which moves over a uniform scale $a$ provided on the scale 5 and the divisions of which are linked up with the measuring scale $m$ by means of oblique connecting strokes $l$. As can readily be seen, it is possible to bring the scale of stops $f$ into the correct position relative to the lower scale $s$ of exposure times, by rotating the member 8 for each exposure time value read off, into the appropriate position for the individual reading, in accordance with the appropriate one of the given plate sensitivities (or some intermediate value), so that for each stop the corresponding exposure time can be read off.

Figure 3:
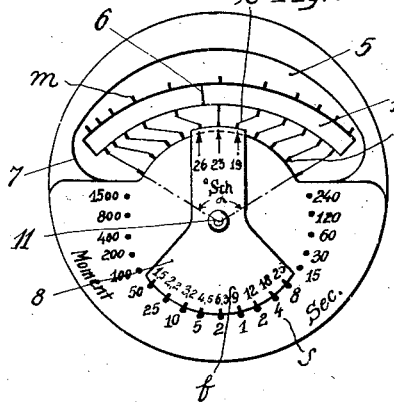
Fig. 3 is a front view of a further embodiment of the invention.
Figure 4:
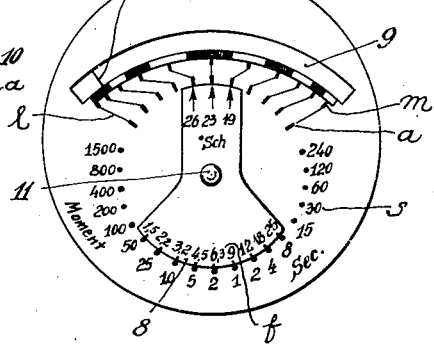
Fig. 4 is a modification of the device shown in Fig. 3.

The uniform auxiliary scale $a$, and possibly the measuring scale $m$ also may be arranged outside, on the front cover of the casing. The pointer 6, as illustrated in Fig. 4, being visible through an opening 9 in the casing cover. Preferably, however, the measuring scale $m$ and the auxiliary scale $a$ are arranged on an inner scale dial 5, which is arranged in front of the pointer 6 and has an opening 10 through which the pointer 6 can be viewed, as shown in Fig. 3. The measuring scale $m$ is preferably calibrated for the stop $f/6.3$ and 26° Sch. so that for these values the question of interpolation of the results does not arise. However, as is illustrated in Fig. 4, the measuring scale $m$ may also be left unmarked, so that the member 8 must be adjusted after each measurement. The angle $\alpha$ subtended by the auxiliary scale $a$ is made as large as possible, preferably as much as possible greater than 90°, so that the connecting lines $l$ for the auxiliary scale $a$ are short and straight and so that a great arc length is obtained for the lower time scale $s$ and also for the movement of the rotary member 8.

The arrangement may be so devised that the centre 11 of the rotary member 8 coincides with the centre of the casing and of the measuring system. However, it will sometimes be preferable to arrange the three centres in such a manner that the centre of the rotary member lies between the centres of the casing and the moving coil system.

In order to make the connecting lines $l$ between the logarithmic measuring scale $m$ and the uniform auxiliary scale $a$ clearly distinguishable, they may advantageously be executed in alternately different colours or distinguished in some other way.

We claim:—

1. Exposure meter comprising a casing having a substantially flat front wall, a photo-electric element and a direct current measuring instrument both mounted within said casing and electrically connected together, said measuring instrument including a rotatable shaft operated thereby and arranged at right angles to said front wall, a pointer on said shaft adapted to move in an arcuate path behind said front wall and in a plane parallel thereto, a measuring scale fixed adjacent said pointer for indicating deflections thereof, a window in the upper part of said front wall and in front of said pointer, an arcuate fixed scale on the lower part of said front wall, a flat, at least partially, sector shaped member rotatably pivoted in the middle part of said front wall, and two scales on said member and rotatable therewith, one of which being adjacent to and cooperating with said measuring scale and the other adjacent to and cooperating with said fixed scale, said fixed and rotatable scales indicating exposure times, plate sensitivities and stop values.

2. Exposure meter as defined in claim 1, wherein the said sector shaped member is pivoted between the centre of said casing and the shaft of said measuring instrument.

3. Exposure meter comprising a casing having a substantially flat front wall, a photo-electric element and a direct current measuring instrument both mounted within said casing and electrically connected together, a pointer operated by said measuring instrument and adapted to move in an arcuate path behind said front wall, an arcuate non-uniform measuring scale fixed adjacent said pointer such that said pointer indicates values on said non-uniform scale, an arcuate uniform measuring scale fixed adjacent said non-uniform scale and connected division-by-division therewith, a fixed scale on said front wall, a flat member rotatably pivoted in said front wall, and two scales on said member and rotatable therewith, one of said rotatable scales being adjacent to and cooperating with said uniform measuring scale and the other of said two rotatable scales being adjacent to and cooperating with said fixed scale, said fixed and said two rotatable scales indicating exposure times, plate sensitivities and stop values.

4. Exposure meter comprising a casing having a substantially flat front wall, a photo-electric element and a direct current measuring instrument both mounted within said casing and electrically connected together, a pointer operated by said measuring instrument and adapted to move in an arcuate path behind said front wall, an arcuate non-uniform measuring scale fixed adjacent said pointer such that said pointer indicates values on said non-uniform scale, an arcuate uniform measuring scale fixed adjacent said non-uniform scale and division-by-division therewith, a fixed scale of exposure times on said front wall, a flat member rotatably pivoted in said front well, a scale of plate sensitivities and a scale of stop values both on said member and rotatable therewith, the said scale of plate sensitivities being adjacent to and cooperating with said uniform measuring scale, and said scale of stop values being adjacent to and cooperating with said scale of exposure times.

ALBRECHT BERNHARD.
GUIDO BEYRICH.
HANS HABERMANN.